United States Patent
Heyl et al.

(10) Patent No.: US 11,654,927 B2
(45) Date of Patent: May 23, 2023

(54) METHOD FOR MONITORING A VEHICLE SYSTEM FOR DETECTING AN ENVIRONMENT OF A VEHICLE

(71) Applicant: Robert Bosch GmbH, Stuttgart (DE)

(72) Inventors: Andreas Heyl, Weil der Stadt (DE); Thomas Gussner, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 136 days.

(21) Appl. No.: 17/196,250

(22) Filed: Mar. 9, 2021

(65) Prior Publication Data

US 2021/0300394 A1  Sep. 30, 2021

(30) Foreign Application Priority Data

Mar. 25, 2020 (DE) .................. 102020203829.5

(51) Int. Cl.
*B60W 50/00* (2006.01)
*B60W 50/04* (2006.01)
*B60W 50/02* (2012.01)

(52) U.S. Cl.
CPC ...... *B60W 50/045* (2013.01); *B60W 50/0205* (2013.01); *B60W 2050/0215* (2013.01)

(58) Field of Classification Search
None
See application file for complete search history.

(56) References Cited

U.S. PATENT DOCUMENTS

| | | | |
|---|---|---|---|
| 11,334,762 B1* | 5/2022 | Wrenninge | G06K 9/6256 |
| 2020/0139981 A1* | 5/2020 | Schwindt | B60W 50/0205 |
| 2020/0183411 A1* | 6/2020 | Oba | B60W 50/14 |
| 2022/0004782 A1* | 1/2022 | Matthes | G06V 20/58 |
| 2022/0269279 A1* | 8/2022 | Redford | G05D 1/0044 |

* cited by examiner

*Primary Examiner* — James M McPherson
(74) *Attorney, Agent, or Firm* — Maginot, Moore & Beck LLP

(57) ABSTRACT

A method for monitoring a vehicle system configured to detect an environment of a vehicle, wherein the vehicle system has a sensor system with at least two sensor units configured to capture the environment of the vehicle, and an evaluation unit configured to detect objects in the environment of the vehicle by merging sensor data of the at least two sensor units. The method includes, for each of the detected objects, using sensor data to determine separately for each of the at least two sensor units a probability of existence indicating a probability of the detected object representing a real object, and a probability of detection indicating a probability with which the detected object can be captured by the sensors. The method includes determining whether the vehicle system is in a robust state based on the probability of existence and the probability of detection.

9 Claims, 1 Drawing Sheet

METHOD FOR MONITORING A VEHICLE SYSTEM FOR DETECTING AN ENVIRONMENT OF A VEHICLE

This application claims priority under 35 U.S.C. § 119 to patent application no. DE 10 2020 203 829.5, filed on Mar. 25, 2020 in Germany, the disclosure of which is incorporated herein by reference in its entirety.

The present disclosure relates to a method for monitoring a vehicle system for detecting an environment of a vehicle. Furthermore, the disclosure relates to an evaluation unit, a computer program and a computer-readable medium for carrying out the method as well as a corresponding vehicle system.

BACKGROUND

To detect an environment of a vehicle, sensor data of different sensors of the vehicle can be assembled by suitable algorithms into a common representation of the environment, which is also called sensor data fusion. The aim of such sensor data fusion is to merge the respective sensor data in such a way that the respective strengths of the sensors are profitably combined with each other or respective weaknesses of the sensors are reduced. Whether the environment is correctly detected under different external conditions depends in particular on how robustly such a vehicle system works.

SUMMARY

Against this background, a method, an evaluation unit, a computer program and a computer-readable medium according to the disclosure are presented with the approach presented here. Advantageous developments of and improvements to the approach presented here result from the description.

Embodiments of the present disclosure allow in an advantageous manner the estimation of the robustness of a vehicle system with multiple sensors for environment detection on the basis of sensor-specific probabilities of existence and detection. As a result, false positives, false negatives, or other incorrect results when detecting objects can be avoided.

A first aspect of the disclosure concerns a method for monitoring a vehicle system for detecting an environment of a vehicle, wherein the vehicle system has a sensor system with at least two sensor units for capturing the environment of the vehicle and an evaluation unit for detecting objects in the environment of the vehicle by merging sensor data of the at least two sensor units. The method includes the following steps: determining a probability of existence and a probability of detection for each of the detected objects based on the sensor data, wherein the probability of existence indicates the probability of the detected object representing a real object in the environment of the vehicle, and the probability of detection indicates the probability with which the detected object can be captured by the sensors, wherein the probability of existence and the probability of detection are determined separately for each of the at least two sensor units; and determining whether the vehicle system is in a robust state or not on the basis of the probability of existence and the probability of detection.

A vehicle can generally be understood as a partially automated or fully automated moving machine. For example, the vehicle can be a car, truck, bus, motorcycle, robot or similar.

The vehicle system may be designed to control the vehicle partly or fully automatically. For this purpose, the vehicle system can control a corresponding actuator system of the vehicle, such as steering or brake actuators or an engine control unit.

A sensor unit may be, for example, a radar sensor, a lidar sensor, an ultrasonic sensor, or a camera. The sensor system may include similar (for example, redundant) or different (for example, complementary) sensor units. For example, a combination of a radar sensor with a camera or a combination of several radar sensors with different detection devices.

The sensor data can be features captured by the respective sensor unit such as position, velocity, acceleration, extent, or object category of objects in the environment of the vehicle. The features may have been extracted from raw data of the respective sensor unit.

To detect the environment of the vehicle, the sensor data can be fused together. Such sensor data fusion can be understood as a process in which information from different sensor instances is used to detect and classify objects in the environment of the vehicle (also called object discrimination) and to estimate the respective states of the objects, i.e. to predict them with a certain probability (also called track estimation).

In this context, a detected object may be a model of a real object located in the environment of the vehicle, such as an observed vehicle, a road marking, a pedestrian or similar. The detected objects, together with their respective features, can be stored in an environment model representing the environment of the vehicle, which can be continuously updated based on the sensor data by comparing predicated states of the objects with current measurements.

For example, the probability of existence can indicate the probability with which a measurement history and a motion pattern of a detected object were produced by a real object.

The probability of detection may, for example, depend on a position of an object relative to an installation location of the respective sensor unit on the vehicle or on environmental conditions, which may limit the perception of the respective sensor unit.

By determining the probability of existence and the probability of detection individually for each sensor unit or sensor instance, it is possible to estimate the influence of individual sensor units or sensor instances on an overall result of the sensor data fusion.

A second aspect of the disclosure relates to an evaluation unit which is configured to perform the method as described above and below. Features of this method may also be features of the evaluation unit and vice-versa.

A third aspect of the disclosure concerns a vehicle system which is configured to perform the method as described above and below. Features of this method may also be features of the vehicle system and vice-versa.

Further aspects of the disclosure relate to a computer program which, if it is executed by a computer, such as the evaluation unit mentioned above, performs the method as described above and below, as well as a computer-readable medium on which such a computer program is stored.

The computer-readable medium may be a volatile or non-volatile data memory. For example, the computer-readable medium may be a hard drive, a USB memory device, a RAM, ROM, EPROM, or flash memory. The computer-readable medium can also provide a data communication network such as the Internet or a data cloud enabling the downloading of a program code.

Features of the method as described above and below may also include features of the computer program and/or the computer-readable medium and vice-versa.

Ideas on embodiments of the present disclosure can be regarded, among other things, as based on the thoughts and findings described below.

According to one embodiment, the sensor system comprises at least a first sensor unit, a second sensor unit and a third sensor unit. It is determined that the vehicle system is in a non-robust state if, with respect to a detected object, a probability of existence associated with the first sensor unit is outside an expected range, a probability of existence associated with the second sensor unit and a probability of existence associated with the third sensor unit are within the expected range and the probabilities of detection associated with the respective sensor units are recognized as high.

It is possible that the at least three sensor units are different sensor instances, i.e. sensor types.

An expected range can be understood as a predefined value or range of values.

For example, the probability of detection can be recognized as high if it is above a detection threshold representing a high probability of detection.

This allows false positive or false negative detections to be avoided. As a result, impairments that affect all sensor units commonly, such as an undetected masking, can also detected.

According to one embodiment, it is determined that the vehicle system is in a non-robust state if, with regard to a detected object, a probability of detection associated with the first sensor unit and a probability of detection associated with the second sensor unit are recognized as low and a probability of detection associated with the third sensor unit and a probability of existence associated with the third sensor unit are recognized as high.

For example, the probability of detection can be detected as low if it is below a detection threshold representing a low probability of detection.

For example, the probability of existence can be detected as high if it is above a probability of existence representing a high probability of existence.

The detection threshold or the existence threshold may vary depending on the sensor unit, for example depending on the installation location of the sensor unit on the vehicle or a distance of the sensor unit from an object to be detected in the environment of the vehicle.

According to one embodiment, the sensor data include features recognized by the respective sensor unit of the objects in the environment of the vehicle. Based on the sensor data, a plurality of possible assignment matrices are generated, each of which describes possible associations between the features and the detected objects and/or between the detected objects and at least one preprocessing algorithm. An assignment matrix for updating the detected objects is selected from the plurality of possible assignment matrices. It is also determined that the vehicle system is in a non-robust state when at least two different assignment matrices and/or two different preprocessing algorithms are selected alternately within a predefined time span.

In an assignment matrix, each feature, more precisely each feature hypothesis, can have at least one assigned detected object, more precisely at least one object hypothesis, and/or at least one detected object can have at least one assigned preprocessing algorithm. The individual assignments can be weighted, for example, by using costs.

Updating an environment model based on a plurality of alternative assignment matrices can also be referred to as a multi-hypothesis approach.

In contrast to classic multi-hypothesis tracking, the sensor data can be processed here, for example, using various preprocessing algorithms, i.e. the assignment matrix may select different preprocessing algorithms. As a result, different variants of the processing of the sensor data can be carried out in parallel.

For example, the preprocessing algorithms may be selected depending on a detected object type and/or depending on a specific functional performance of the preprocessing algorithms (also depending on object type and/or environmental conditions).

Frequent switching between different assignment matrices or preprocessing algorithms, such as between the best rated preprocessing algorithms, may indicate reduced robustness of the environment capture.

According to one embodiment, the detected objects are stored in an environment model representing the environment of the vehicle. It is also determined whether or not the vehicle system is in a robust state, depending on how often the environment model reverts from a current state to a trusted state within a predefined period of time.

According to one embodiment, the method further includes: setting the vehicle system into a safety mode when it has been determined that the vehicle system is in a non-robust state. The safety mode may, for example, include that the vehicle is slowed down, a planned trajectory of the vehicle is changed or certain maneuvers of the vehicle, such as a lane change, are prevented.

BRIEF DESCRIPTION OF THE DRAWINGS

Embodiments of the disclosure are described below with reference to the attached drawings, wherein neither the drawings nor the description are to be interpreted as restrictive of the disclosure.

The figures are only schematic and are not true to scale. The same reference characters denote identical or identically acting features in the figures.

DETAILED DESCRIPTION

Figure 1:
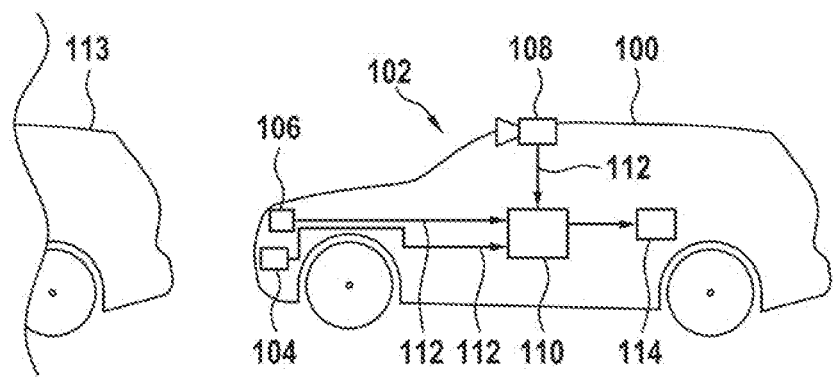
FIG. 1 shows a vehicle with a vehicle system in accordance with an exemplary embodiment.

FIG. 1 shows a vehicle 100 with a vehicle system 102, which has a sensor system with a first sensor unit 104, here a radar sensor, a second sensor unit 106, here a lidar sensor, and a third sensor unit 108, here a camera, for capturing objects in an environment of the vehicle 100 and an evaluation unit 110 for evaluating the respective sensor data 112 of the three sensor units 104, 106, 108. As an example, the sensor system in FIG. 1 detects a vehicle ahead 113.

In addition, the vehicle system 102 may include an actuator system 114, such as steering actuators or brake actuators or an engine controller of the vehicle 100. The evaluation unit 110 can control the actuator system 114 based on the sensor data 112 in an appropriate manner, for example to control the vehicle 100 fully automatically.

In order to recognize the vehicle ahead 113 as an object, the sensor data 112 of the different sensor units 104, 106, 108 are appropriately fused with each other in the evaluation unit 110. The detected object is stored in an environment model and continuously updated based on sensor data 112, which is also known as tracking. In each time step, future states of the detected object are estimated in the environment model and compared with the current sensor data 112.

In order to determine whether the vehicle system 102 has sufficient robustness, i.e. can correctly detect objects in the environment of the vehicle 100 under different environmental conditions, based on the sensor data 112 the evaluation unit 110 determines a probability of existence for each of the detected objects indicating the probability with which the detected object, for example a model of the vehicle ahead 113, corresponds to a real object, here the actual vehicle ahead 113. Furthermore, the evaluation unit 110 determines a probability of detection, indicating the probability of the sensor system detecting an object in the environment of the vehicle 100, here the vehicle ahead 113, at all.

The probabilities of existence and the probabilities of detection are both object-specific and sensor-specific. In other words, the probabilities of existence and the probabilities of detection are determined individually for each of the three sensor units 104, 106, 108, so that for each object which is detected in the context of sensor data fusion, a respective probability of existence and probability of detection of the sensor units or sensor instances involved in the sensor data fusion are known.

The probabilities of existence and the probabilities of detection will be evaluated in order to assess the robustness of the vehicle system 102, as described in more detail below.

Figure 2:
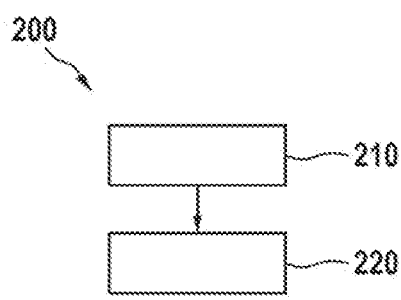
FIG. 2 shows a flowchart of a method according to an exemplary embodiment.

FIG. 2 shows a flowchart of a method 200 as it can be implemented by the vehicle system 102 from FIG. 1.

In a first step 210, as already mentioned, the probabilities of existence and the probabilities of detection relating to the detected objects are determined for each of the three sensor units 104, 106, 108.

In a second step 220, the respective probabilities of existence and the probabilities of detection of different sensor units are compared with each other in order to conclude the robustness of the vehicle system 102, depending on the deviation.

For example, it is recognized that the vehicle system 102 is not robust if, with respect to the detected vehicle ahead 113, a probability of existence associated with the first sensor unit 104 is outside an expected range, while a probability of existence associated with the second sensor unit 106 and a probability of existence associated with the third sensor unit 108 are each within the expected range and moreover the probabilities of detection of all three sensor units 104, 106, 108 are recognized as high, for example because they are above a predefined threshold. In other words, the lack of robustness of the vehicle system 102 is detected when the first sensor unit 104 provides a result for a (relatively long) predefined duration which differs from or even contradicts the respective results of the second sensor unit 106 and the third sensor unit 108.

The deviation can be caused by the fact that the probability of existence of the first sensor unit 104 is significantly greater compared to those of the sensor units 106, 108, which could result in a false positive result, or is significantly lower, which could result in a false negative result. Another reason for such a deviation may be, for example, unrecognized masking, which affects all three sensor units 104, 106, 108.

The lack of robustness can also be detected, for example, if a low probability of existence is determined for one of the sensor units 104, 106, 108 in relation to all objects in the field of view for a relatively long period of time, but these objects are simultaneously detected by the other sensor units. This may indicate a failure of the sensor unit in question.

Furthermore, the lack of robustness can be detected if a low probability of detection has been determined with respect to a detected object for two of the three sensor units 104, 106, 108 and simultaneously the detected object is assigned a high probability of existence by a third sensor unit. The detection of the lack of robustness can be carried out in particular if this is the case multiple times within a predefined period of time.

In addition, hypotheses from multi-hypothesis tracking can be used to determine whether or not the vehicle system 102 is operating robustly.

A possible indicator that there is a system weakness or sensitivity is, for example, when two or more different (contradictory) hypotheses or models are selected alternately within a relatively short period of time, i.e. jumping back and forth between two or more different hypotheses or models.

Another indicator may be if the environment model or one of the objects stored in the environment model reverts for too long or too often from a current state to a trusted replacement state within a predefined period of time.

An overall trustworthiness of a selected hypothesis with respect to an object recognized as real can also be determined over several time steps. If this is too low too often within a certain period of time, then a non-robust condition of the vehicle system 102 can also be concluded.

As a result of step 220, for example, a binary information item can be output, which either indicates that the vehicle system 102 is robust or indicates that the vehicle system 102 is not robust.

Alternatively or additionally, detailed information can be output, for example about possible causes of the system weakness or system sensitivity or about which sensor units or sensor data are affected.

The detailed information can be used, for example, for diagnostic purposes, for resetting affected sensor units or for testing new areas for autonomous vehicles, also called operational design domains.

In response to the fact that a reduced or non-existent robustness of the vehicle system 102 has been detected, the vehicle system 102 can be placed in a safe operating mode. As a result, the vehicle system 102 can be caused, for example, to decelerate or stop the vehicle 100 or to prevent certain more complex maneuvers such as lane changes or the like.

Finally, it should be noted that terms such as "having" "comprising" etc. do not exclude other elements or steps and terms such as "a" or "one" do not exclude any number. Reference characters in the claims are not to be regarded as a restriction.

What is claimed is:

1. A method for monitoring a vehicle system configured to detect an environment of a vehicle, wherein the vehicle system has (i) a sensor system with at least two sensor units configured to capture the environment of the vehicle and (ii) an evaluation unit configured to detect a plurality of objects in the environment of the vehicle by merging sensor data of the at least two sensor units, the method comprising:

determining, based on the sensor data, a probability of existence and a probability of detection for each respective object of the plurality of objects for each of the at least two sensor units, wherein the probability of existence indicates a probability of the respective object representing a real object in the environment of the vehicle, and the probability of detection indicates a probability with which the respective object can be captured by the at least two sensor units;

determining whether the vehicle system is in a robust state based on the probability of existence and the probability of detection for each of the plurality of objects, the robust state being one in which the vehicle system can correctly detect objects in the environment; and setting the vehicle system into a safety mode in response to determining that the vehicle system is not in the robust state.

2. The method according to claim 1, wherein the at least two sensor units of the sensor system include at least a first sensor unit, a second sensor unit and a third sensor unit, the method further comprising:

determining that the vehicle system is not in the robust state when (i) a probability of existence associated with the first sensor unit is outside an expected range, (ii) a probability of existence associated with the second sensor unit and a probability of existence associated with the third sensor unit are each within the expected range, and (iii) probabilities of detection associated with each of the first sensor unit, the second sensor unit, and the third sensor unit are recognized as exceeding a predefined threshold high.

3. The method according to claim 1, wherein the at least two sensor units of the sensor system include at least a first sensor unit, a second sensor unit and a third sensor unit, the method further comprising:

determining that the vehicle system is not in the robust state when (i) a probability of detection associated with the first sensor unit and a probability of detection associated with the second sensor unit in relation to an object of the plurality of objects are each recognized as falling below a first predefined threshold, and (ii) a probability of detection associated with the third sensor unit and a probability of existence associated with the third sensor unit are recognized as exceeding a second predefined threshold.

4. The method according to claim 1, wherein the sensor data include features detected by the at least two sensor units of the plurality of objects in the environment of the vehicle the method further comprising:

producing, based on the sensor data a plurality of possible assignment matrices, each describing at least one of (i) possible associations between the features and the detected objects and (ii) possible associations between the detected objects and at least one preprocessing algorithm;

selecting, from the plurality of possible assignment matrices, an assignment matrix configured to update the detected objects; and determining that the vehicle system is not in the robust state when at least one of two different assignment matrices, and two different preprocessing algorithms are selected alternately within a predefined period of time.

5. The method according to claim 1 further comprising:
storing the detected objects in an environment model representing the environment of the vehicle; and determining that the vehicle system is in the robust state depending on how often the environment model reverts from a current state to a trusted state within a predefined period of time.

6. An evaluation unit of a vehicle system, the evaluation unit configured to:

detect a plurality of objects in an environment of a vehicle by merging sensor data of a sensor system with at least two sensor units of a sensor system of the vehicle system configured to capture the environment of the vehicle;

determine, based on the sensor data, a probability of existence and a probability of detection for each respective object of the plurality of objects for each of the at least two sensor units, wherein the probability of existence indicates a probability of the respective object representing a real object in the environment of the vehicle, and the probability of detection indicates a probability with which the respective object can be captured by the at least two sensor units;

determine whether the vehicle system is in a robust state based on the probability of existence and the probability of detection for each of the plurality of objects, the robust state being one in which the vehicle system can correctly detect objects in the environment; and set the vehicle system into a safety mode in response to determining that the vehicle system is not in the robust state.

7. A vehicle system comprising:
a sensor system with at least two sensor units configured to capture an environment of the vehicle; and
an evaluation unit configured to
detect a plurality of objects in an environment of a vehicle by merging sensor data of the at least two sensor units, determine, based on the sensor data, a probability of existence and a probability of detection for each respective object of the plurality of objects for each of the at least two sensor units, wherein the probability of existence indicates a probability of the respective object representing a real object in the environment of the vehicle, and the probability of detection indicates a probability with which the respective object can be captured by the at least two sensor units, and determine whether the vehicle system is in a robust state based on the probability of existence and the probability of detection for each of the plurality of objects, the robust state being one in which the vehicle system can correctly detect objects in the environment.

8. The vehicle system of claim 7, further comprising:
a computer program, including commands that, when the computer program is run by the evaluation unit, cause the evaluation unit to perform the detection of the plurality of objects, the determination of the probability of existence, the determination of the probability of detection, and the determination whether the vehicle system is in the robust state.

9. The vehicle system of claim 8, wherein the computer program is stored on computer-readable medium.

* * * * *

UNITED STATES PATENT AND TRADEMARK OFFICE
CERTIFICATE OF CORRECTION

PATENT NO. : 11,654,927 B2  
APPLICATION NO. : 17/196250  
DATED : May 23, 2023  
INVENTOR(S) : Heyl et al.

Page 1 of 1

It is certified that error appears in the above-identified patent and that said Letters Patent is hereby corrected as shown below:

In the Claims

In Claim 2, at Column 7, Line 15: "a second sensor unit and a third sensor unit" should read --a second sensor unit, and a third sensor unit--.

In Claim 2, at Column 7, Line 26: "predefined threshold high." should read --predefined threshold.--.

In Claim 3, at Column 7, Line 29: "a second sensor unit and a third sensor unit" should read --a second sensor unit, and a third sensor unit--.

In Claim 4, at Column 7, Lines 37-38: "the vehicle the method further comprising:" should read --the vehicle, the method further comprising:--.

In Claim 4, at Column 7, Line 45: "the sensor data a plurality of" should read --the sensor data, a plurality of--.

Signed and Sealed this  
Twenty-ninth Day of August, 2023

Katherine Kelly Vidal  
*Director of the United States Patent and Trademark Office*